(12) United States Patent
Cheng

(10) Patent No.: US 7,919,876 B2
(45) Date of Patent: Apr. 5, 2011

(54) SMALL-SIZED POWER PACKAGE

(75) Inventor: Yu-Chih Cheng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 232 days.

(21) Appl. No.: 12/433,995

(22) Filed: May 1, 2009

(65) Prior Publication Data
US 2010/0201135 A1   Aug. 12, 2010

(30) Foreign Application Priority Data
Feb. 6, 2009 (TW) .............................. 98103833 A

(51) Int. Cl.
F03B 13/00 (2006.01)
(52) U.S. Cl. ........... 290/1 R; 290/1 A; 290/1 E; 310/15; 310/20; 310/27; 310/36
(58) Field of Classification Search .................. 290/1 A, 290/1 E, 1 R; 310/15, 20, 27, 36, 47, 50
See application file for complete search history.

(56) References Cited

U.S. PATENT DOCUMENTS

| 7,218,009 | B2* | 5/2007 | Hendrickson et al. | 290/1 R |
| 7,692,320 | B2* | 4/2010 | Lemieux | 290/1 R |
| 7,847,421 | B2* | 12/2010 | Gardner et al. | 290/1 R |
| 2007/0018515 | A1* | 1/2007 | Chang et al. | 310/50 |
| 2008/0122306 | A1* | 5/2008 | Kiramidzhyan | 310/80 |

* cited by examiner

Primary Examiner — Tho D Ta
(74) Attorney, Agent, or Firm — Kirton & McConkie; Evan R. Witt

(57) ABSTRACT

A small-sized power package includes a tubular case, a magnet tube, a coil, a power-generating magnet, a shaft, a movable box, and a positioning magnet. The power-generating magnet is attracted by the positioning magnet and thus suspended within the magnet tube. The small-sized power package has enhanced power generating efficiency by utilizing the benefit of magnetic levitation. An electronic device including such a small-sized power package is also provided.

14 Claims, 4 Drawing Sheets

SMALL-SIZED POWER PACKAGE

FIELD OF THE INVENTION

The present invention relates to a small-sized power package, and more particularly to a small-sized power package mounted on a portable electronic device.

BACKGROUND OF THE INVENTION

With increasing development of high technology industries, various portable electronic devices with specified functions have gradually gained popularity in our daily lives. The portable electronic devices include for example mobile phones, MP3 portable players, personal digital assistants (PDAs), digital still cameras or pedometers. By the mobile phones, the users can communicate with others whenever they take the mobile phones. The users can enjoy music whenever and wherever they take the MP3 portable players. The personal digital assistants can be used for recording routine great events or trifles or recording the users' working calendars. The digital still cameras can be used to take splendid images in our daily lives. The pedometers are step counters that can be used as everyday exercise measures.

In designing the portable electronic devices, it is critical to provide sufficient electricity to prolong the using time of the portable electronic devices. There are several approaches for prolonging the using time of the portable electronic device. For example, the use of improved circuitry to reduce the power consumption rate; the use of the strong-effect battery to offer more backup electric energy; or the inclusion of a self-generation module in the portable electronic device.

As for the first approach, it is usually time-consuming for the research and development engineers to find out the best circuitry, and a limited power source (e.g. a battery) is necessary. As for the second approach, the strong-effect battery involves in high-technology and the battery capacity thereof is eventually exhausted. In other words, the third approach of a including a self-generation module in the portable electronic device is more feasible.

For example, a vibration type power generator is disclosed in Taiwanese Patent Publication No. M282416, and the contents of which are hereby incorporated by reference. Instead of using a circularly rotary shaft and a circular winding coil assembly, the shaft and the winding coil assembly of the vibration type power generator of Taiwanese Patent Publication No. M282416 are vertically or horizontally arranged. The vibration type power generator includes a magnet and a coil. The coil is connected to a magnetic slice. When the magnet and the winding coil assembly are arbitrarily vibrated in the upward or downward direction or swung in the left or right direction, a magnetic field is generated by the magnet and the magnetic slice. Due to the magnetic field, an induced current is generated in the coil and thus electric energy is produced. Furthermore, a self-generation battery is disclosed in Taiwanese Patent Publication No. M319580, and the contents of which are hereby incorporated by reference. The self-generation battery includes a displacement generation unit and an energy storage unit. The displacement electric-generation unit produces electric energy according to the displacement. The displacement electric-generation unit includes a tube body, a magnetic-field inducing element and a coil. The magnetic-field inducing element is disposed within the tube body. The magnetic-field inducing element is moved within the tube body back and forth according to the displacement. The coil is arranged on the external surface of the tube body. During the magnetic-field inducing element is moved within the tube body back and forth, an induced current is generated in the coil and thus electric energy is produced. The electric energy is charged to the energy storage unit.

In the above-mentioned technologies, electric energy is produced according to electromagnetic induction by changing the relative position between the magnet and the coil. During the process of moving the magnet, the magnet is readily contacted with other components. Under this circumstance, the potential energy and even the electric energy are reduced.

Therefore, there is a need of providing a displacement-type power package for producing electric energy, in which the possibility of causing component contact is minimized during the generation of electric energy so as to obviate the drawbacks encountered from the prior art.

SUMMARY OF THE INVENTION

It is an object of the present invention to provide a small-sized power package having enhanced power generating efficiency by utilizing the benefit of magnetic levitation.

In accordance with an aspect of the present invention, there is provided a small-sized power package. The small-sized power package includes a tubular case, a magnet tube, a coil, a power-generating magnet, a shaft, a movable box, a positioning magnet and two protective caps. The tubular case has a tubular receptacle in an internal portion thereof. Two shaft supporting elements are protruded from an external surface of the tubular case and are respectively arranged at a front end and a rear end of the tubular case. The magnet tube is accommodated within the tubular receptacle of the tubular case, and has a hollow magnet receptacle in an internal portion thereof. The coil is sheathed around an external surface of the magnet tube, and has a positive end and a negative end. The power-generating magnet is accommodated within the hollow magnet receptacle of the magnet tube. The shaft has both ends respectively fixed on the two shaft supporting elements. The movable box is hung on the shaft and movable with respect to the shaft. The positioning magnet is disposed within the movable box for attracting the power-generating magnet, so that the power-generating magnet is suspended in the hollow magnet receptacle of the magnet tube. The two protective caps are arranged on the front end and the rear end of the tubular case for restricting the magnet tube within the tubular case. When the movable box is moved with respect to the shaft, the power-generating magnet is attracted by the positioning magnet to move, thereby producing electric energy between the positive end and the negative end of the coil.

In an embodiment, the small-sized power package further includes two cushion pads, which are attached on respective protective caps, for absorbing impact and noise caused from movement of the power-generating magnet.

In an embodiment, the shaft supporting elements have respective elongated locking holes, and the both ends of the shaft are fastened in the locking holes.

In an embodiment, two pairs of hanging rod supporting elements are respectively protruded from the front end and the rear end of the movable box, and two hanging rods are supported by corresponding pairs of hanging rod supporting elements such that the movable box is movably hung on the shaft.

In accordance with another aspect of the present invention, there is provided an electronic device having a small-sized power package. The electronic device includes a circuit board, a small-sized power package and two springs. The small-sized power package includes a tubular case, a magnet tube, a coil, a power-generating magnet, a shaft, a movable box, a positioning magnet and two protective caps. The tubular case has a tubular receptacle in an internal portion thereof. Two shaft supporting elements are protruded from an external surface of the tubular case and are respectively arranged at a front end and a rear end of the tubular case. The magnet tube is accommodated within the tubular receptacle of the tubular case, and has a hollow magnet receptacle in an internal portion thereof. The coil is sheathed around an external surface of the magnet tube, and has a positive end and a negative end. The power-generating magnet is accommodated within the hollow magnet receptacle of the magnet tube. The shaft has both ends respectively fixed on the two shaft supporting elements. The movable box is hung on the shaft and movable with respect to the shaft. The positioning magnet is disposed within the movable box for attracting the power-generating magnet, so that the power-generating magnet is suspended in the hollow magnet receptacle of the magnet tube. The two protective caps are arranged on the front end and the rear end of the tubular case for restricting the magnet tube within the tubular case. The two springs are sustained against the circuit board and supports the small-sized power package. When an external force is exerted on the electronic device, elastic forces offered by the springs allow the front end and the rear end of the tubular case to be swung up and down, thereby producing electric energy between the positive end and the negative end of the coil.

Preferably, the electronic device is a mouse, a pedometer, a flashlight, a MP3 portable player, a game console or a wireless telephone.

In an embodiment, each of the two protective caps has a spring supporting post.

In an embodiment, two pillars are disposed at a middle portion between the front end and the rear end of the tubular case, and respectively disposed on bilateral sides of the tubular case.

In an embodiment, the electronic device further includes two bearings, wherein the two pillars are inserted into respective bearings.

In an embodiment, two bearing stands are disposed at two opposite sides of the circuit board.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a small-sized power package. The small-sized power package can produce electric energy according to a displacement resulted from an external force. In addition, the small-sized power package has enhanced power generating efficiency by utilizing the benefit of magnetic levitation.

Figure 1:
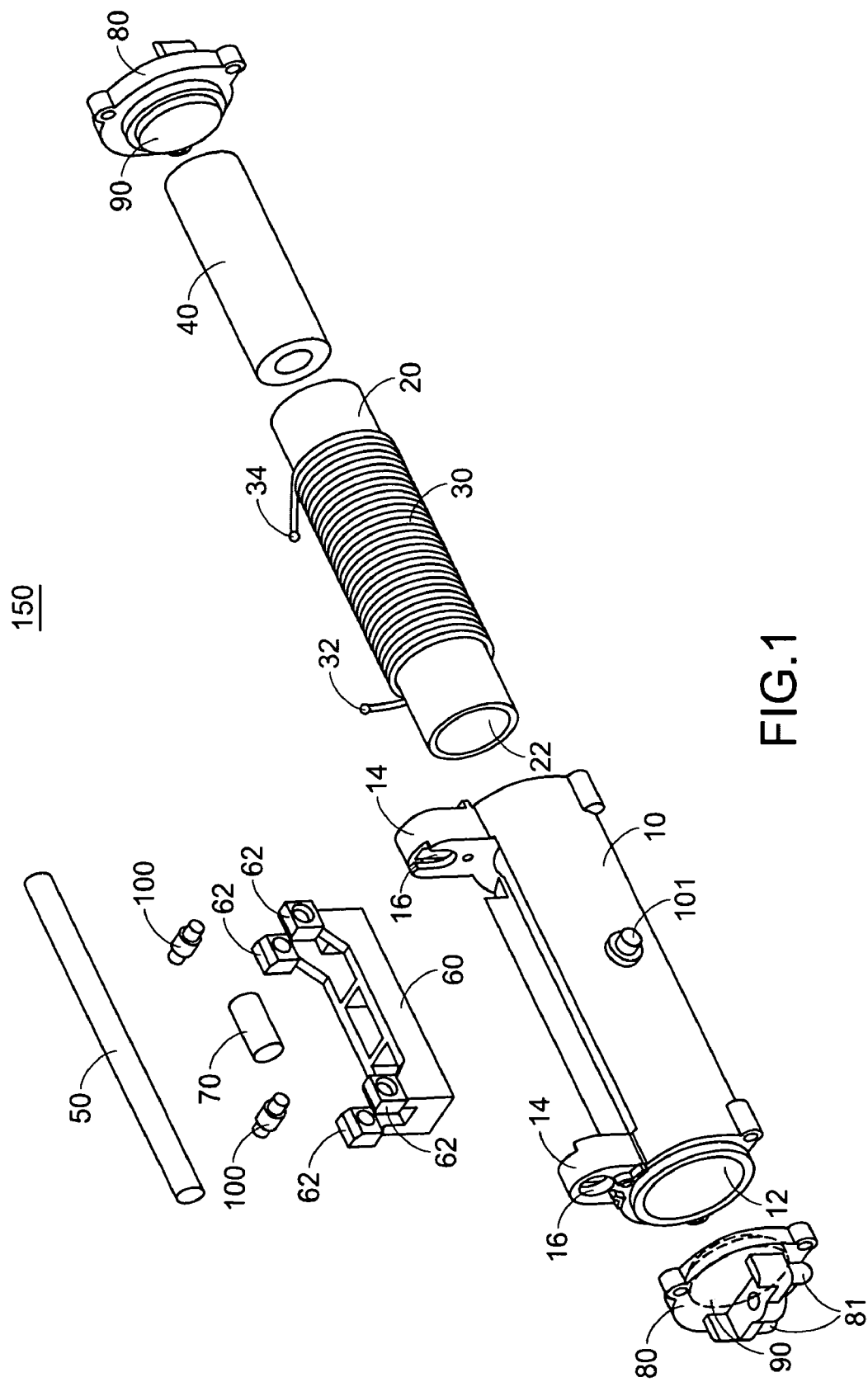
FIG. 1 is a schematic exploded view illustrating a small-sized power package according to an embodiment of the present invention.

FIG. 1 is a schematic exploded view illustrating a small-sized power package according to an embodiment of the present invention. As shown in FIG. 1, the small-sized power package 150 principally comprises a tubular case 10, a magnet tube 20, a coil 30, a power-generating magnet 40, a shaft 50, a movable box 60, a positioning magnet 70, two protective caps 80, two cushion pads 90 and two hanging rods 100. The internal portion of the tubular case 10 has a tubular receptacle 12. Two shaft supporting elements 14 are protruded from the external surface of the tubular case 10 and are respectively arranged at the front end and the rear end of the tubular case 10. The shaft supporting elements 14 have respective elongated locking holes 16. The internal portion of the magnet tube 20 has a hollow magnet receptacle 22. The coil 30 has a positive end 32 and a negative end 34. Two pairs of hanging rod supporting elements 62 are respectively protruded from the front end and the rear end of the movable box 60.

Each of the two protective caps 80 of the small-sized power package 150 has two spring supporting posts 81. In addition, two pillars 101 are disposed at the middle portion between the front end and the rear end of the tubular case 10 (only one pillar 101 is shown in the drawing) and respectively disposed on bilateral sides of the tubular case 10. Via the pillars 101, the small-sized power package 150 can be mounted in an electronic device. After the small-sized power package 150 is mounted in the electronic device, electric energy provided by the small-sized power package 150 can be transmitted to the electronic device.

Figure 2:
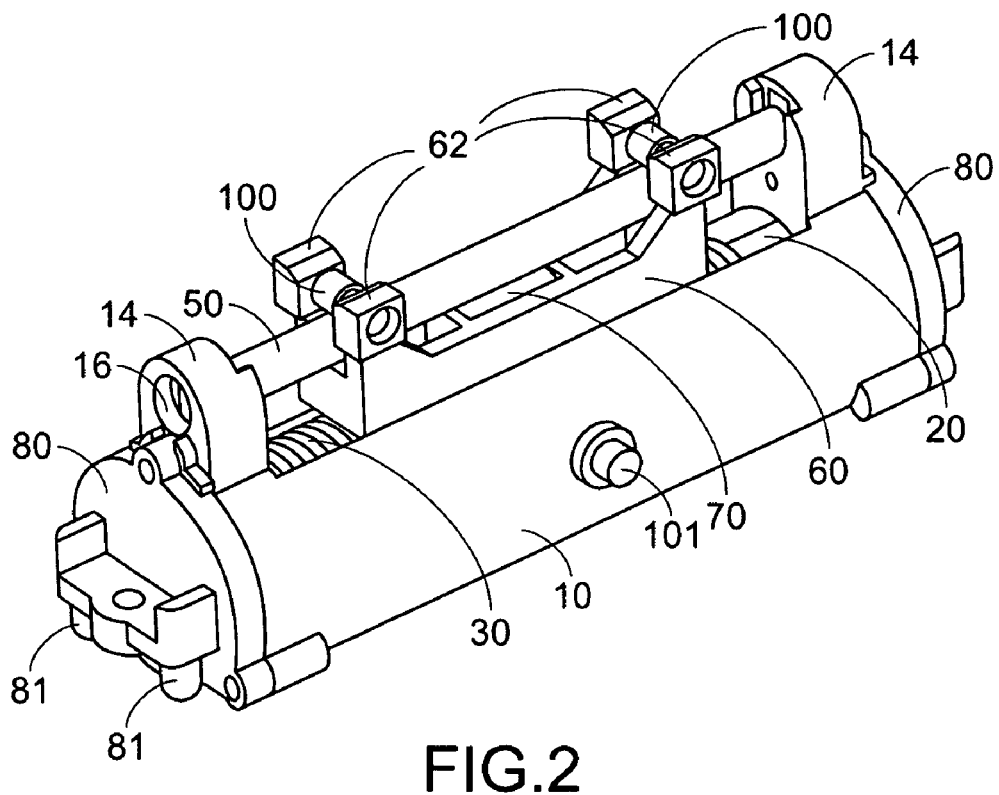
FIG. 2 is a schematic assembled view of the small-sized power package of FIG. 1.

A process of assembling the small-sized power package 150 will be illustrated in more details as follows. First of all, the magnet tube 20 is accommodated within the tubular receptacle 12 of the tubular case 10. Next, the coil 30 is sheathed around the external surface of the magnet tube 20. The power-generating magnet 40 is accommodated within the hollow magnet receptacle 22 of the magnet tube 20. Next, the two protective caps 80 are placed on the front end and the rear end of the tubular case 10, respectively. For absorbing the impact and noise caused from position shift of the power-generating magnet 40, two cushion pads 90 are attached on respective protective caps 80 and at the lateral sides facing the magnet tube 20. In addition, the shaft supporting elements 14 at the front end and the rear end of the tubular case 10 have respective elongated locking holes 16. The both ends of shaft 50 are fastened in the elongated locking holes 16 such that the shaft 50 is fixed on the shaft supporting elements 14. The middle of the movable box 60 has a positioning magnet receiving part 64. Next, the positioning magnet 70 is accommodated in the positioning magnet receiving part 64. According to the magnetic levitation theory, the positioning magnet 70 attracts the power-generating magnet 40. As such, the power-generating magnet 40 is suspended in the magnet tube 20 and is not in direct contact with the inner surface of the magnet tube 20. The resulting structure of the small-sized power package 150 is shown in FIG. 2.

Figure 3:
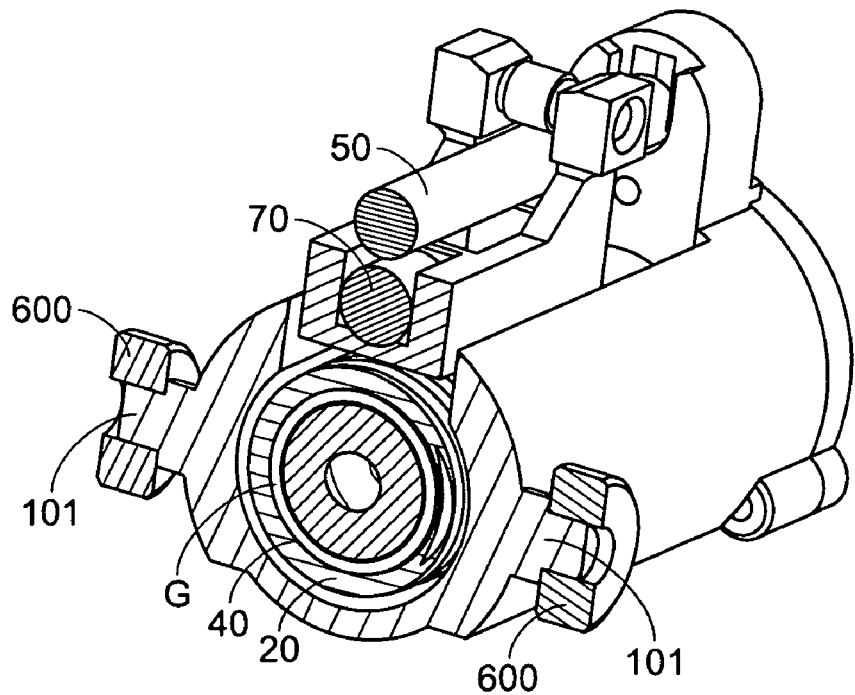
FIG. 3 is a schematic cutaway view of the small-sized power package of FIG. 1.

FIG. 3 is a schematic cutaway view of the small-sized power package of FIG. 1. As shown in FIG. 3, there is a gap G between the power-generating magnet 40 and the magnet tube 20. In other words, the power-generating magnet 40 is suspended in the magnet tube 20. In addition, two pairs of hanging rod supporting elements 62 are respectively protruded from the front end and the rear end of the movable box 60. Each hanging rod 100 is supported by each pair of hanging rod supporting elements 62. Via the hanging rods 100, the movable box 60 is movably hung on the shaft 50.

The operations of the small-sized power package 150 to produce electric energy will be illustrated as follows. In a case that an external force is exerted on the small-sized power package 150, the movable box 60 that is hung on the shaft 50 is moved along the shaft 50. Since the positioning magnet 70 in the movable box 60 attracts the power-generating magnet 40, the power-generating magnet 40 is moved within the magnet tube 20 and the position of the power-generating magnet 40 is changed with respect to the magnet tube 20. Due to a change of the magnetic flux, the coil 30 sheathed around the external surface of the magnet tube 20 produces electric energy between the positive end 32 and the negative end 34 of the coil 30. Since the power-generating magnet 40 is suspended in the magnet tube 20, the power-generating magnet 40 is not contacted with the inner surface of the magnet tube 20 during movement of the power-generating magnet 40. In other words, the use of the small-sized power package 150 to produce electric energy will not result in unnecessary power loss.

Figure 4:
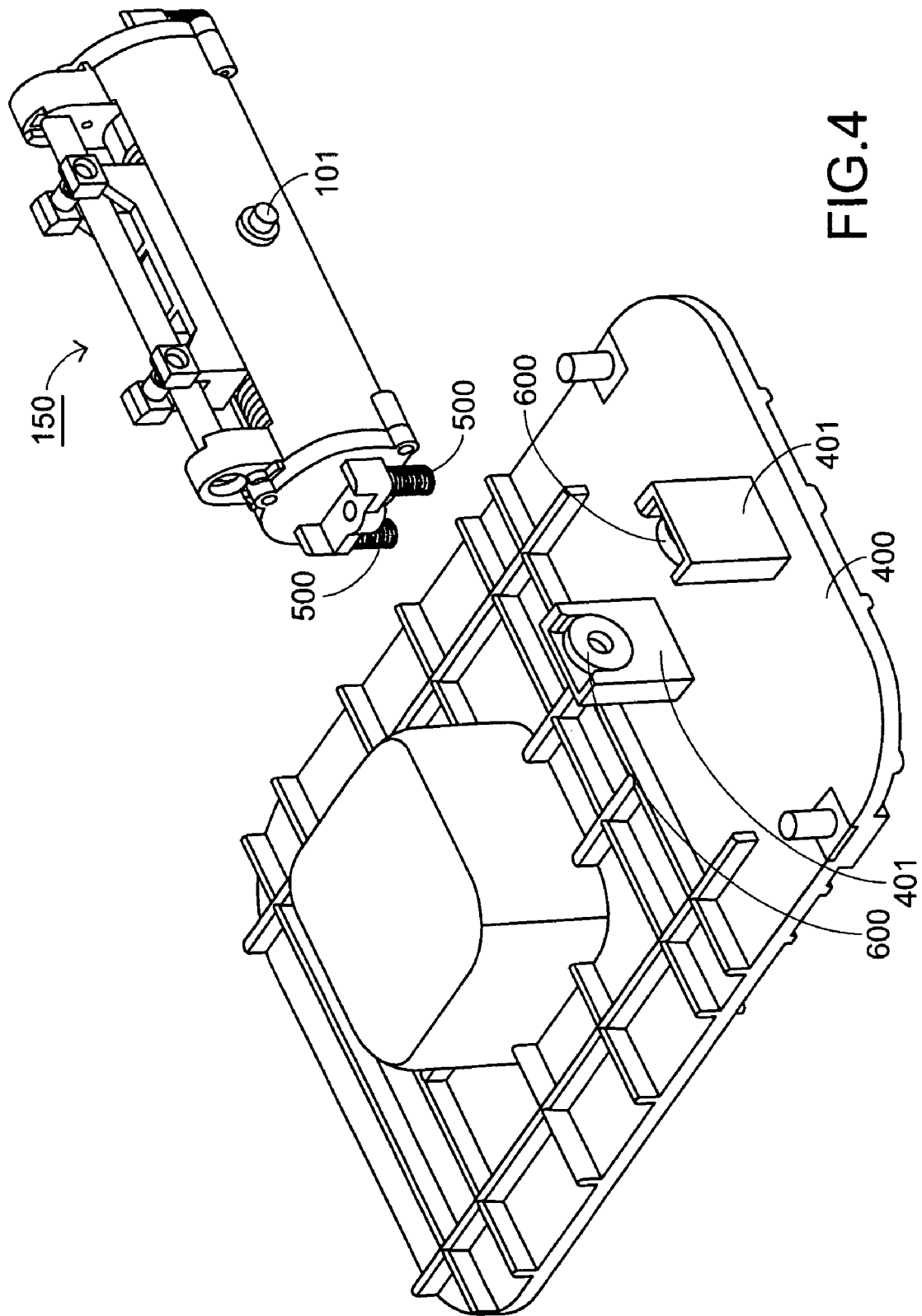
FIG. 4 is a schematic exploded view illustrating the small-sized power package of FIG. 1 to be mounted on a circuit board of an electronic device.

FIG. 4 is a schematic exploded view illustrating the small-sized power package of FIG. 1 to be mounted on a circuit board of an electronic device. The electronic device 600 can be any portable electronic device requiring a power supply system. An example of the electronic device includes but is not limited to a mouse, a pedometer, a flashlight, a MP3 portable player, a game console or a wireless telephone.

Figure 5:
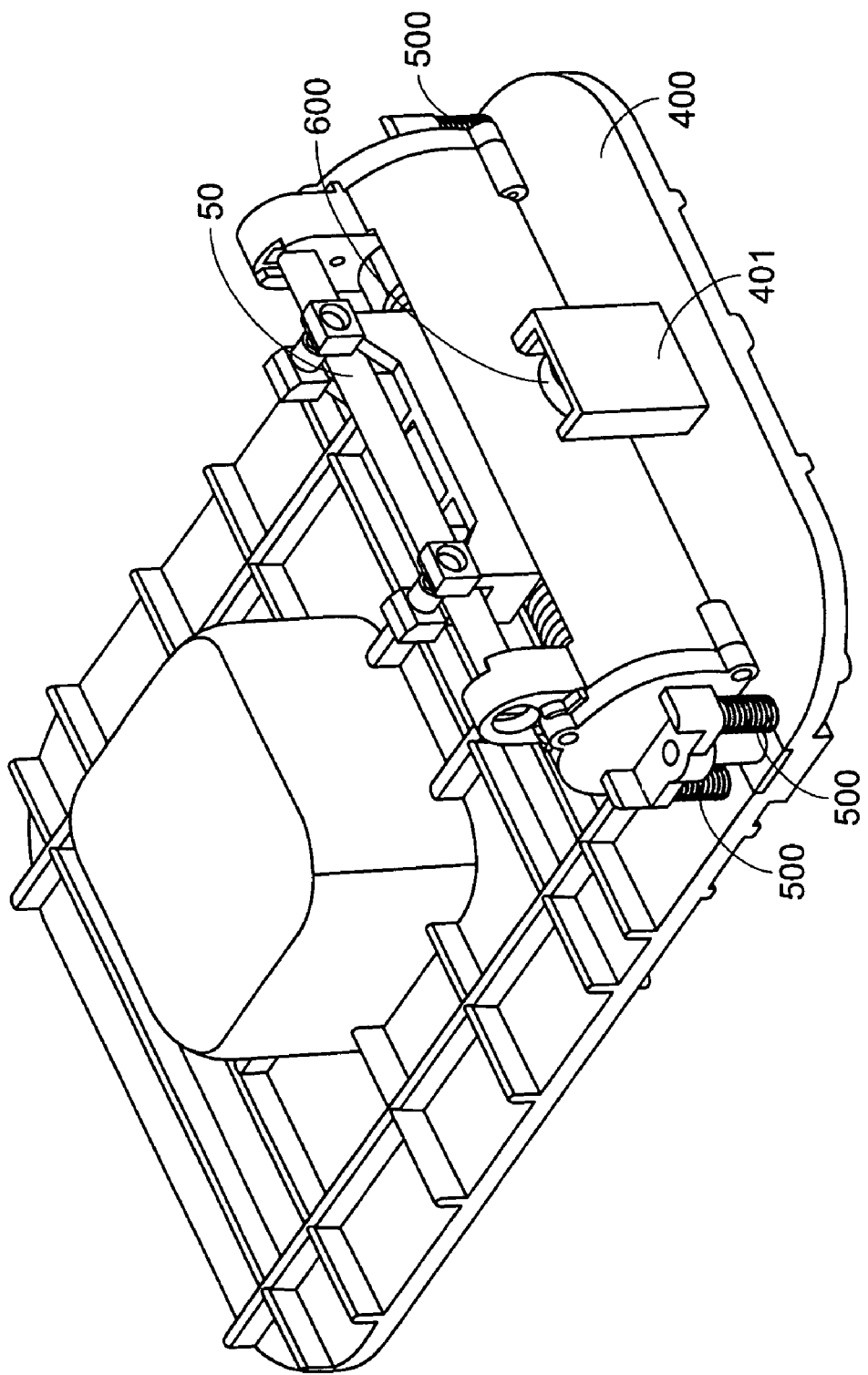
FIG. 5 is a schematic view illustrating a combination of the small-sized power package and the circuit board of the electronic device.

FIG. 4 illustrates a circuit board 400 of the electronic device and the small-sized power package 150. In addition, two bearing stands 401 are disposed at two opposite sides of the circuit board 400. Corresponding to the pillars 101 of the small-sized power package 150, two bearings 600 are fixed on respective bearing stands 401. After the pillars 101 of the small-sized power package 150 are inserted into respective bearings 600, the small-sized power package 150 is mounted on the circuit board 400 of the electronic device. Moreover, two spring supporting posts 81 at the front side of the of the small-sized power package 150 and two spring supporting posts 81 at the front side of the small-sized power package 150 are all sheathed with respective helical springs 500. FIG. 5 is a schematic view illustrating a combination of the small-sized power package and the circuit board of the electronic device. By means of the pillars 101 and the bearing stands 401, the small-sized power package 150 is positioned on the circuit board 400. In addition, the helical springs 500 provide elastic forces to support the small-sized power package 150.

In a case that an external force is exerted on the electronic device, the elastic forces offered by the helical springs 500 will allow the front end and the rear end of the small-sized power package 150 to be swung up and down by using the pillars 101 as the fulcrums. As the small-sized power package 150 is swung, the movable box 60 is moved and thus the position of the power-generating magnet 40 is changed. Due to the displacement of the power-generating magnet 40, the small-sized power package 150 produces electric energy.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A small-sized power package comprising:
a tubular case having a tubular receptacle in an internal portion thereof, wherein two shaft supporting elements are protruded from an external surface of said tubular case and are respectively arranged at a front end and a rear end of said tubular case;
a magnet tube accommodated within said tubular receptacle of said tubular case, and having a hollow magnet receptacle in an internal portion thereof;
a coil sheathed around an external surface of said magnet tube, and having a positive end and a negative end;
a power-generating magnet is accommodated within said hollow magnet receptacle of said magnet tube;
a shaft having both ends respectively fixed on said two shaft supporting elements;
a movable box hung on said shaft and movable with respect to said shaft;
a positioning magnet disposed within said movable box for attracting said power-generating magnet, so that said power-generating magnet is suspended in said hollow magnet receptacle of said magnet tube; and
two protective caps arranged on said front end and said rear end of said tubular case for restricting said magnet tube within said tubular case,
wherein when said movable box is moved with respect to said shaft, said power-generating magnet is attracted by said positioning magnet to move, thereby producing electric energy between said positive end and said negative end of said coil.

2. The small-sized power package according to claim 1 further comprising two cushion pads, which are attached on respective protective caps, for absorbing impact and noise caused from movement of said power-generating magnet.

3. The small-sized power package according to claim 1 wherein said shaft supporting elements have respective elongated locking holes, and said both ends of said shaft are fastened in said locking holes.

4. The small-sized power package according to claim 1 wherein two pairs of hanging rod supporting elements are respectively protruded from said front end and said rear end of said movable box, and two hanging rods are supported by corresponding pairs of hanging rod supporting elements such that said movable box is movably hung on said shaft.

5. An electronic device having a small-sized power package, said electronic device comprising:
a circuit board; and
a small-sized power package comprising:
a tubular case having a tubular receptacle in an internal portion thereof, wherein two shaft supporting elements are protruded from an external surface of said tubular case and are respectively arranged at a front end and a rear end of said tubular case;
a magnet tube accommodated within said tubular receptacle of said tubular case, and having a hollow magnet receptacle in an internal portion thereof;
a coil sheathed around an external surface of said magnet tube, and having a positive end and a negative end;
a power-generating magnet is accommodated within said hollow magnet receptacle of said magnet tube;
a shaft having both ends respectively fixed on said two shaft supporting elements;
a movable box hung on said shaft and movable with respect to said shaft;
a positioning magnet disposed within said movable box for attracting said power-generating magnet, so that said power-generating magnet is suspended in said hollow magnet receptacle of said magnet tube; and two protective caps arranged on said front end and said rear end of said tubular case for restricting said magnet tube within said tubular case; and two springs sustained against said circuit board and supporting said small-sized power package, wherein when an external force is exerted on the electronic device, elastic forces offered by said springs allow said front end and said rear end of said tubular case to be swung up and down, thereby producing electric energy between said positive end and said negative end of said coil.

6. The electronic device according to claim 5 wherein said small-sized power package further includes two cushion pads, which are attached on respective protective caps, for absorbing impact and noise caused from movement of said power-generating magnet.

7. The electronic device according to claim 5 wherein said shaft supporting elements have respective elongated locking holes, and said both ends of said shaft are fastened in said locking holes.

8. The electronic device according to claim 5 wherein said two pairs of hanging rod supporting elements are respectively protruded from said front end and said rear end of said movable box, and two hanging rods are supported by corresponding pairs of hanging rod supporting elements such that said movable box is movably hung on said shaft.

9. The electronic device according to claim 5 wherein each of said two protective caps has a spring supporting post.

10. The electronic device according to claim 5 wherein said electronic device is a portable electronic device.

11. The electronic device according to claim 5 wherein said electronic device is a mouse, a pedometer, a flashlight, a MP3 portable player, a game console or a wireless telephone.

12. The electronic device according to claim 5 wherein two pillars are disposed at a middle portion between said front end and said rear end of said tubular case, and respectively disposed on bilateral sides of said tubular case.

13. The electronic device according to claim 12 further comprising two bearings, wherein said two pillars are inserted into respective bearings.

14. The electronic device according to claim 12 wherein two bearing stands are disposed at two opposite sides of said circuit board.

* * * * *